United States Patent
Peri et al.

(10) Patent No.: US 10,567,292 B2
(45) Date of Patent: Feb. 18, 2020

(54) TRAFFIC SHAPER WITH POLICER(S) AND ADAPTIVE TIMERS

(71) Applicant: Intel Corporation, Santa Clara, CA (US)

(72) Inventors: Surekha Peri, Austin, TX (US); Vijaya Bhaskar Kommineni, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 15/087,878

(22) Filed: Mar. 31, 2016

(65) Prior Publication Data

US 2017/0250916 A1 Aug. 31, 2017

Related U.S. Application Data

(60) Provisional application No. 62/301,450, filed on Feb. 29, 2016.

(51) Int. Cl.
  *H04L 12/815* (2013.01)
  *H04L 12/875* (2013.01)

(52) U.S. Cl.
  CPC ............ *H04L 47/22* (2013.01); *H04L 47/562* (2013.01)

(58) Field of Classification Search
  CPC ............................... H04L 47/22; H04L 47/562
  See application file for complete search history.

(56) References Cited

U.S. PATENT DOCUMENTS

| | | | |
|---|---|---|---|
| 7,668,087 B2* | 2/2010 | Hussain | H04L 43/026 370/230 |
| 7,688,853 B2 | 3/2010 | Santiago et al. | |
| 10,187,317 B1* | 1/2019 | Amdahl | H04L 47/39 |
| 2002/0039349 A1 | 4/2002 | Malaney et al. | |
| 2003/0118056 A1* | 6/2003 | Ali | H04N 21/4305 370/503 |
| 2006/0221835 A1 | 10/2006 | Sweeney | |
| 2006/0236002 A1* | 10/2006 | Valenci | H04L 69/28 710/48 |

(Continued)

OTHER PUBLICATIONS

International Search Report and Written Opinion dated Apr. 26, 2017 for International Application No. PCT/US2017/014457, 13 pages.

(Continued)

*Primary Examiner* — Jamal Javaid
*Assistant Examiner* — Thad N Defauw
(74) *Attorney, Agent, or Firm* — Schwabe, Williamson & Wyatt, P.C.

(57) ABSTRACT

Apparatuses, methods and storage medium associated with a traffic shaper having one or more policers and adaptive timers are disclosed herein. The traffic shaper is to shape packet traffics of a plurality of regulated traffic generating entities. The policer is to process incoming packets of the regulated traffic generating entities and determine whether to forward or temporarily hold the packets. A buffer is to store the packets to be temporarily held; and the timer task manager is to process timer tasks of the regulated traffic generating entities and determine whether to discard the timer tasks or forward to regulate release of held packets of the regulated traffic generating entities. Other embodiments may be disclosed or claimed.

25 Claims, 6 Drawing Sheets

(56) References Cited

U.S. PATENT DOCUMENTS

| | | | |
|---|---|---|---|
| 2008/0025214 A1* | 1/2008 | Bettink | H04L 47/10 |
| | | | 370/230 |
| 2010/0290342 A1 | 11/2010 | Washburn et al. | |
| 2012/0008636 A1 | 1/2012 | Lee | |
| 2013/0128896 A1 | 5/2013 | Munoz | |
| 2015/0282086 A1* | 10/2015 | Gupta | H04W 52/0229 |
| | | | 455/574 |
| 2016/0179716 A1* | 6/2016 | An | G06F 13/24 |
| | | | 710/262 |
| 2017/0286168 A1* | 10/2017 | Simpson | G06F 9/505 |

OTHER PUBLICATIONS

Extended European Search Report dated Aug. 19, 2019 for European Patent Application No. 17760430.3; 4 pages.

* cited by examiner

TRAFFIC SHAPER WITH POLICER(S) AND ADAPTIVE TIMERS

RELATED APPLICATION

This application is a non-provisional application of U.S. provisional application 62/301,450, entitled "Traffic Shaper with Policer(s) and Adaptive Timers," filed on Feb. 29, 2016. The Specification of U.S. provisional application 62/301,450 is hereby fully incorporated by reference.

TECHNICAL FIELD

The present disclosure relates to the fields of networking and computing. In particular, the present disclosure is related to a traffic shaper with one or more policers and adaptive timers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

There are many network applications that are required to be compliant with a desired traffic rate, i.e. control the rate at which packets are sent into the network and/or other processing blocks within the device. This is required to achieve application quality of experience (QoE), network QoS and fairness of network bandwidth across multiple user flows of a device or a group of devices. A lot of applications do not have access to hardware accelerators that can perform elaborate traffic bandwidth management. When a device or a group of devices homes several thousands to millions of user flows, there is a need for efficient software traffic shaping implementations.

Traffic shaping is a traffic management technique that enforces a desired output traffic profile for the traffic generating entities, such as user flows. The profile consists of the amount of traffic in a given duration and inter packet departure characteristics for the traffic generating entities. This involves delaying some incoming packets to bring the packet output of the traffic generating entities into compliance with the desired traffic profile. Existing solutions to traffic shaping include leaky bucket, token bucket and combinations thereof. These include a multi stage functionality in which the incoming packets of the traffic generating entities are buffered in the first stage and released in a regulated fashion in the second stage, and there is a third component of generating the regulating timer triggers. Different algorithms, such as leaky bucket or token buckets are used to regulate the traffic. Such implementations are expensive to implement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
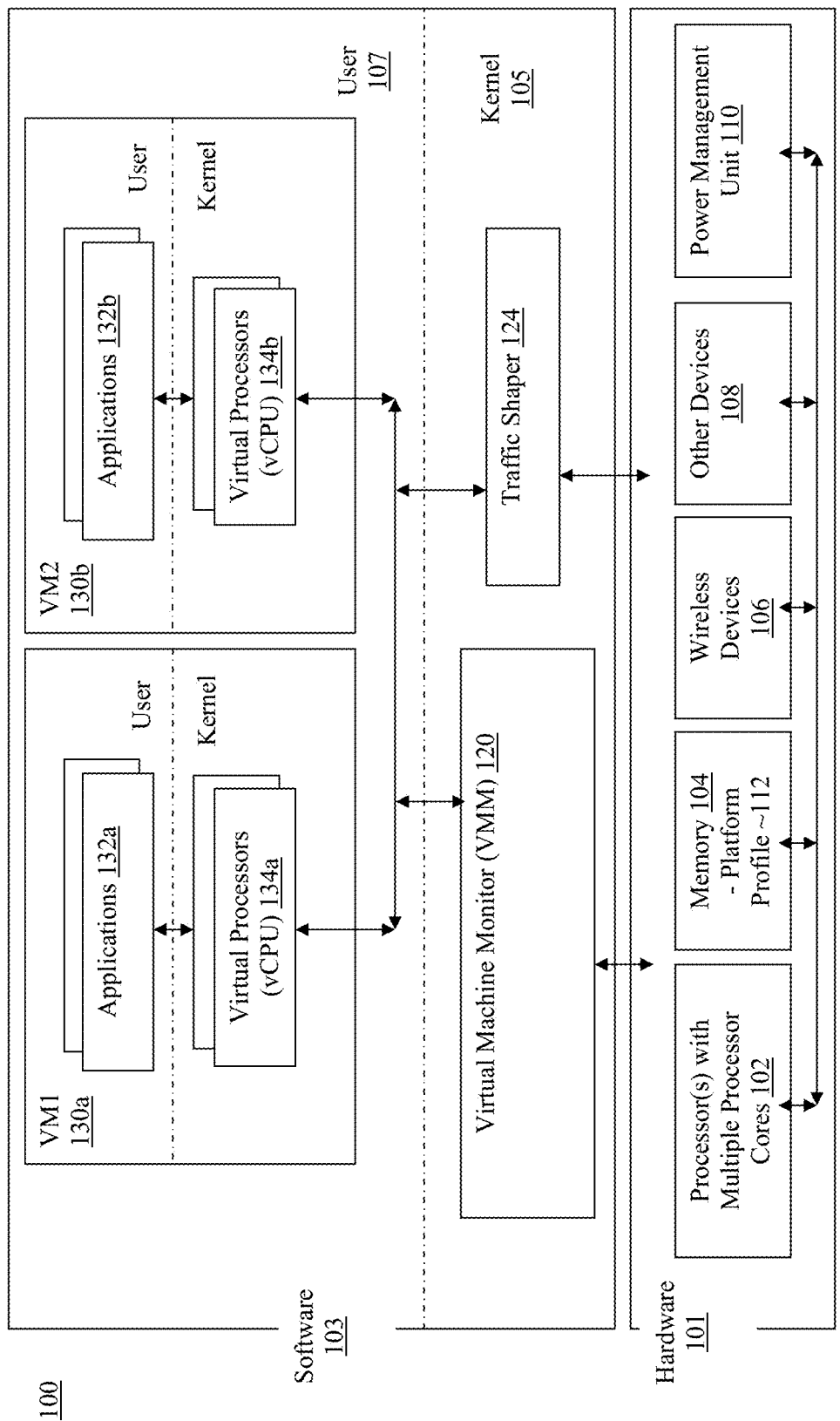
FIG. 1 illustrates an overview of an example computing environment incorporated with the traffic shaper of the present disclosure, in accordance with various embodiments.

Apparatus and method are disclosed herewith with a traffic shaper that leverages a combination of policer(s) (traffic metering), timers and packet arrivals to achieve low overhead traffic shaping of packets being sent by a number of traffic generating entities, such as user flows, into a network. Classical implementations of a traffic shaper may use a leaky bucket or a token bucket approach with a de-coupled enqueuer and a dequeuer. In embodiments, the traffic shaper of the present disclosure may be configured to include a single stage enqueuer and dequeuer for durations of active traffic and reduces the usage of the timers to the extent of non-compliance. Further, the traffic shaper of the present disclosure may be configured to use a policer to monitor the compliance and release controlled amount of traffic of the traffic generating entities. The policer may be configured to generate a two or three color result depending on the specific technique used—a two color green/red classification or a three color green/yellow/red classification. These colors may be translated to a traffic shaping rate compliance/non-compliance. Nominally red may be considered non-compliant, while the other colors may be considered compliant. Usage of yellow may depend on other policies active in the system such as down grading (to red) under congestion and up grading (to green) under no congestion. Non-compliant traffic may be buffered for a later transmission and timers may be started to regulate buffered traffic. This may allow for all compliant traffic to be traffic shaped with minimal cost, and incur the cost of timers only for non-compliant traffic.

In embodiments, the traffic shaper of the present disclosure may additionally use continued packet arrivals to complement the timers. Packet compliance determinism may be done on the arriving packet for non-backlogged traffic and on the packet(s) at the head of the queue of a regulated traffic generating entity for backlogged traffic. The head of the queue may be accessed by a variety of techniques including pre-caching and is outside the scope of this disclosure. Such a mechanism may allow for a higher degree of inherent fairness across multiple traffic generating entities than a typical timer based traffic release, as the timers are modulated with the randomness of network arrivals, reducing the need for targeted fairness mechanisms or smaller timer granularities.

Those skilled in the art would appreciate the traffic shaper piggy backs the traffic shaping functionality to a packet arrival. Performing additional functionalities in a packet processing flow may be less expensive than having an asynchronous additional stage of timer processing for every packet.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "traffic shaper" as used herein refers to a module or routine that takes input traffics from traffic generating entities at arbitrary rates and releases the traffic as per pre-defined bandwidth regulations (bps) on the traffic generating entities. Traffics of the traffic generating entities are buffered while waiting to be released by the traffic shaper. In practical implementations, the buffering may be limited.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example computing device having the traffic shaper technology of the present disclosure, according to various embodiments, is shown. As illustrated, in embodiments, computer device 100 may include hardware 101 and software 103. Software 103 may include kernel 105 and user space 107. Kernel 105 may include a traffic shaper 124 incorporated with the teachings of the present disclosure to efficiently shape an amount of network traffic sent on the network by various traffic generating entities, e.g., user flows of the various applications 132a/132b of VM 130a/130b, the applications 132a/132b or the VM 130a/130b. In other words, the traffic shaping may be practiced at any one of a selected granularity levels, user flows, applications, or VMs, with traffic shaper 124 configured accordingly. In embodiments, traffic shaper 124 may be a single stage traffic shaper with policer and adaptive timers. In alternate embodiments, traffic shaper 124 may be a multi-level hierarchical traffic shaper with policer and adaptive timers. These and other aspects related to traffic shaper 124 will be further described below with references to FIGS. 2-4, after further description of FIG. 1. However, before doing so, it should be noted that while for ease of understanding, traffic shaper 124 is being described as part of kernel 105, in alternate embodiments, there could be multiple traffic shapers, e.g., disposed in selected ones or each VM, and in each case, the traffic shaper may be disposed either in the kernel or user space of the VM. Further, traffic shaper 124 may also be implemented in a non-virtualized computing environment having a single operating system (OS) without VMs and VMM.

In embodiments, hardware 101 may include processor(s) 102, memory 104, wireless devices 106, other devices 108 and power management unit (PMU) 110. Processor(s) 102 may be any one of a number of processors known in the art, having one or more processor cores. At least some of the one or more processor cores may be configured to support mapping to multiple virtual processors (vCPU) of VMs, e.g., vCPU 134a and 134b of VM 130a and 130b. Memory 104 may be any known volatile or non-volatile memory in the art, suitable for storing data. Memory 104 may include a hierarchy of cache memory and system memory. Both the cache and system memory may be respectively organized into cache pages and memory pages. Wireless devices 106 may include various wireless communication or networking interfaces known, such as WiFi, Cellular 3G/4G, Bluetooth®, Near Field Communication, and so forth. Other devices 108 may include wired communication or networking interfaces, such as Ethernet, Universal Serial Bus (USB), and so forth; storage devices, such as solid state, magnetic and/or optical drives; input devices, such as keyboard, mouse, touch sensitive screen, and so forth; and output devices, such as, display devices, printers, and so forth. PMU 110 may be configured to provide power and/or regulate power provided to the various hardware components (at the different states). In embodiments, the various hardware components, in particular, wireless components 106, may have corresponding drivers (not shown) in kernel 105.

VMM 120 of kernel 105 may be configured to manage operation and resource allocation to the various VM 130a/130b, e.g., instantiation/spawning and consolidation of VM 130a/130b, mapping of processor cores of processor 102 to vCPU 134a/134b of VM 130a/130b, mapping of virtual addresses of VM 130a/130b to the physical addresses of memory 104, and so forth, and monitor operations of VM 130a/130b. VMM 120 may be any one of a number of VMMs known.

Each of VM 130a and 130b may include a number of vCPUs 134a/134b (that are virtualization of the processor cores of processor 102) in its kernel, and applications 132a/132b operated by vCPU 134a/134b in its user space. Applications 132a and 132b may be any applications known. Each of VM 130a and 130b may further include a guest operating system (OS) (not shown) in its kernel. The guest OS may likewise be any one of a number of OS known in the art, e.g., the Windows OS from Microsoft® Corporation. While for ease of understanding, only two VM 130a and 130b are shown in FIG. 1, the present disclosure is not limited. Computing device 100 may have any number of VMs, subject only to the performance requirements and resources available.

Figure 2:
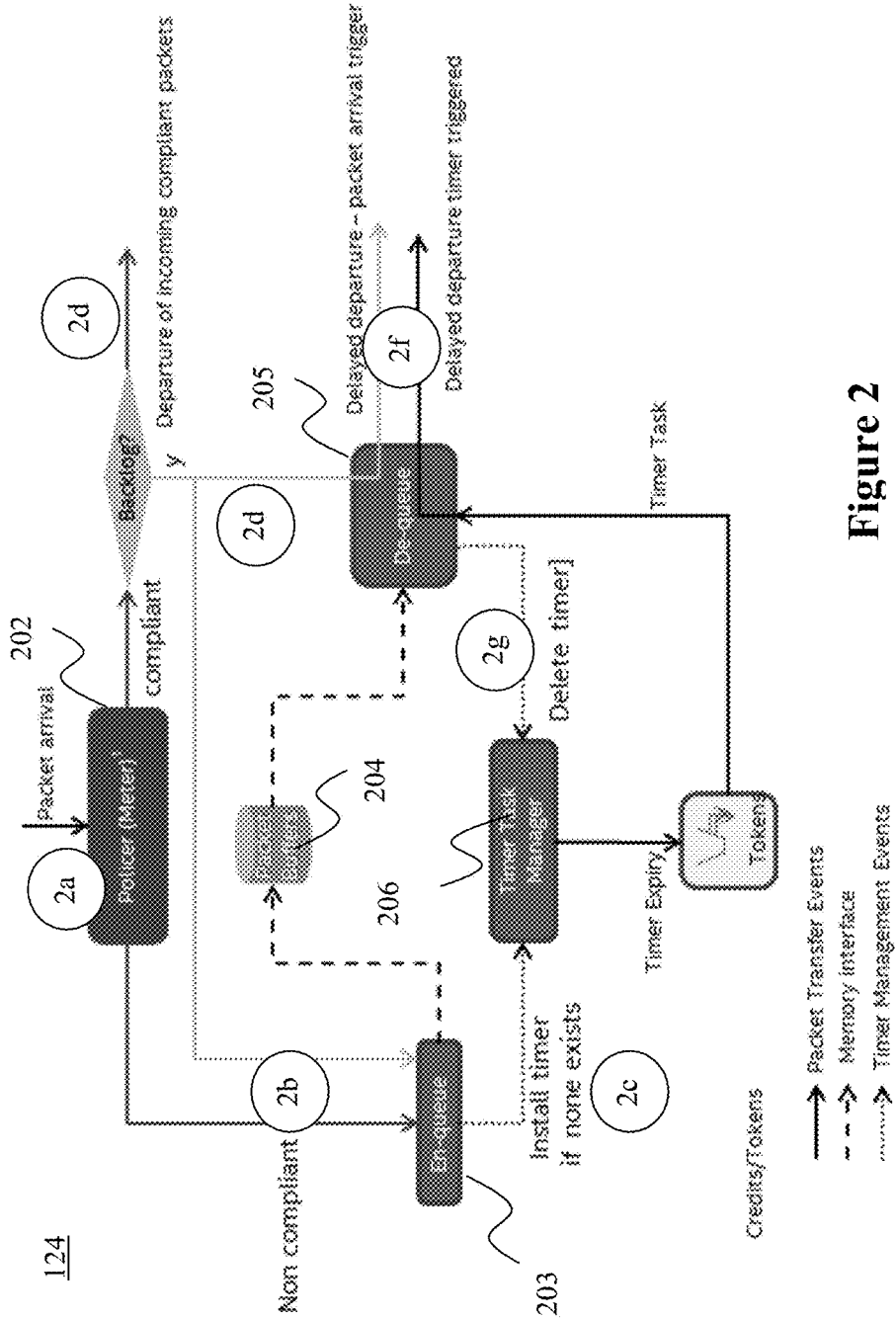
FIG. 2 illustrates a single stage traffic shaper with a policer, a timer task manager, and adaptive timers, and an example operation flow, in accordance with various embodiments.

FIG. 2 illustrates a single stage traffic shaper with a policer and adaptive timers, and an example operation flow/algorithmic structure, in accordance with various embodiments. As illustrated, in embodiments, traffic shaper 124 may include policer 202, buffer 204, timer task manager 206, enqueuer block 203 and de-queue block 205. Traffic shaper 124 may be configured to have the following event triggers:
packet arrival
adaptive timer arrival In response to the event trigger, traffic shaper 124, more specifically, policer 202 and timer task manager 206 may be respectively configured to make one of the following decisions:

Policer 206
Whether arriving packet of a regulated traffic generating entity is compliant or non-compliant to the configured traffic shaping rate (2a):
If a result of the decision indicates the arriving packet of the regulated traffic generating entity is non-compliant,
the current packet may be held (2b) in buffer 204, using enqueue block 203 to enqueue the current packet. In embodiments, the current packet may be queued in corresponding queues of the regulated traffic generating entities, or shared queue/queues.
Further, a timer may be installed (2c) if none exists, and buffer 204 does not have queued packets of the regulated traffic generating entity at the time the arriving packet is stored into buffer 204. In embodiments, the timer may be adaptive, to be described more fully below.
If a result of the decision indicates the arriving packet of the regulated traffic generating entity is compliant,
If buffer 204 does not have queued packets of the regulated traffic generating entity (i.e., no backlog), the current packet may be forwarded to the next functional block (e.g., a networking interface (NIC) or another processing entity) (2d), using dequeue block 205.
If buffer 204 is has queued packets of the regulated traffic generating entity (i.e., backlogged), the current packet may be held (2b) in buffer 204, using enqueue block 203, and the buffered packets worth the available credit may be released to the next functional element via the dequeue block 205 (2f).

Timer Task manager 206
For adaptive timer arrival,
If buffer 204 has queued packets of the regulated traffic generating entity and if the available credits are adequate for releasing one or more packets of the regulated traffic generating entity, an amount of the regulated traffic generating entity, within the regulated bandwidth rate, is forwarded to next processing block (2f), (i.e., de-queue block 205 to cause release of queued packets).
If buffer 204 does not have queued packets of the regulated traffic generating entity, inadequate credits or stale timer, the timer is discarded as a stale timer (2g).
Further, in embodiments, if the granted credit is greater than a bucket size, then the timer may be re-circulated for the residual credit. This may reduce burstiness of the outgoing traffic and increase fairness across multiple regulated traffic generating entities.

Any standard implementation of policer 202 can be used for traffic shaper 124. The specific mechanisms of generating the adaptive timer are not essential to traffic shaper 124—any mechanisms such as a timer wheel or a dedicated timer task manager can be used. In embodiments, the timer task manager may be configured to support multiple timer granularities organized in different timer bins, adaptive timers of the regulated traffic generating entities may be stored in the order of arrivals against the desired timer granularity, and the timer task manager may examine each timer bin, and all eligible adaptive timers may be operated upon. Each timer bin may be a FIFO (first-in-first-out) of a list of user flows and the next timer task to be generated.

Figure 3:
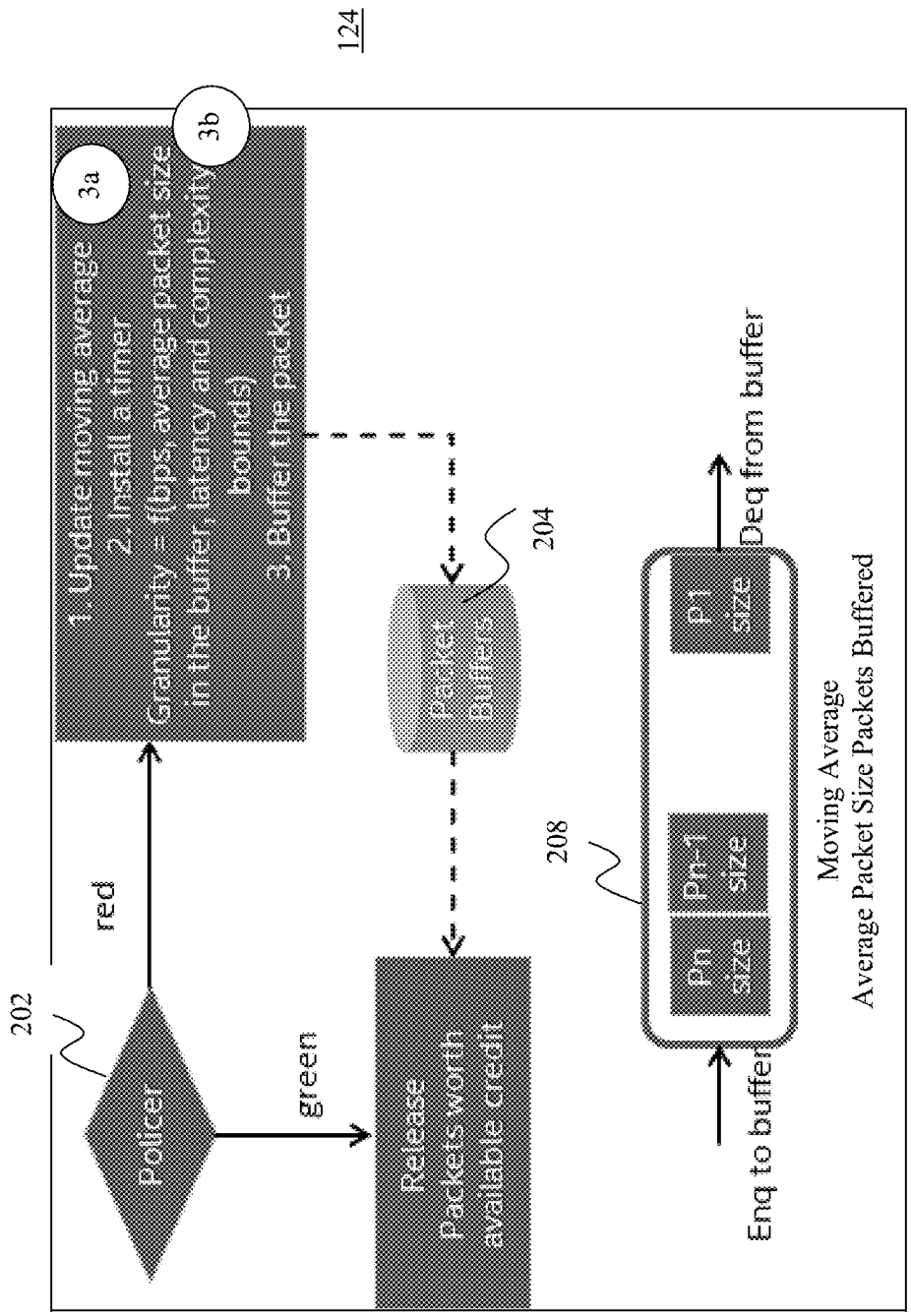
FIG. 3 illustrates aspects of an adaptive timer in further detail, in accordance with various embodiments.

FIG. 3 illustrates aspects of an adaptive timer in further detail, in accordance with various embodiments.

In embodiments, when a timer of a regulated traffic generating entity is installed, the state of the regulated traffic generating entity may be stored in the timer granularity specific timer bin. Classical traffic shapers use a timer granularity tuned for the bytes-per-second (bps) rate of traffic shaper 124 and a static expected average packet size. For the illustrated embodiments, traffic shaper 124 may be configured to dynamically adapt the timer to the packet size of the regulated traffic generating entity by continuously computing and maintain a moving average size of packets of the regulated traffic generating entity that are buffered (3a). In other embodiments, a global moving average size across the regulated traffic generating entities may be calculated instead. In still other embodiments, the timer may be adapted to the size of the last arrived packet of the regulated traffic generating entity or all regulated traffic generating entities. The timer granularity may be a function of the regulated bandwidth (bps), the computed moving average size of packets that get buffered, latency requirements and complexity (processor cycles) bounds of a regulated traffic generating entity or all regulated traffic generating entities (3b). As an example, latency tolerant traffic may use a larger timer granularity and latency sensitive traffic could use smaller timer granularity. This may provide an additional latency reducing feature. A timer granularity may be selected such that at least one average packet worth of credits may be accumulated at the configured rate of the traffic shaper before the timer generates a task. This may allow for latency and complexity optimized traffic shaper. This may be of specific interest in low bandwidth regulated traffic generating entities. In alternate embodiments, other ways of enhancing the prediction of expected average packet size, such as pre-caching the packet size information of the next few enqueued packets in the event of a backlog, may be practiced.

In embodiments, a generated timer task of a regulated traffic generating entity may contain information on task generation time, expiry time, amount of credit, and an average packet size of packets that get buffered for the specific regulated traffic generating entity. The task expiry time may allow for the timer to be discarded, should the credits been consumed by an arriving packet of the regulated traffic generating entity.

In embodiments, a timer task of a regulated traffic generating entity can be scheduled to a processor core via a directed or a load balanced queue. The timer task may be discarded if it has expired. As many timer tasks may be serviced from the timer queue, as are valid at the current time.

Further, in embodiments, with the adaptive timer scheme, traffic shaper 124 may be scaled to a multi-core implementation with dedicated or load balanced queues. The timer tasks and traffic for a specific regulated traffic generating entity may be load balanced to the same core.

Figure 4:
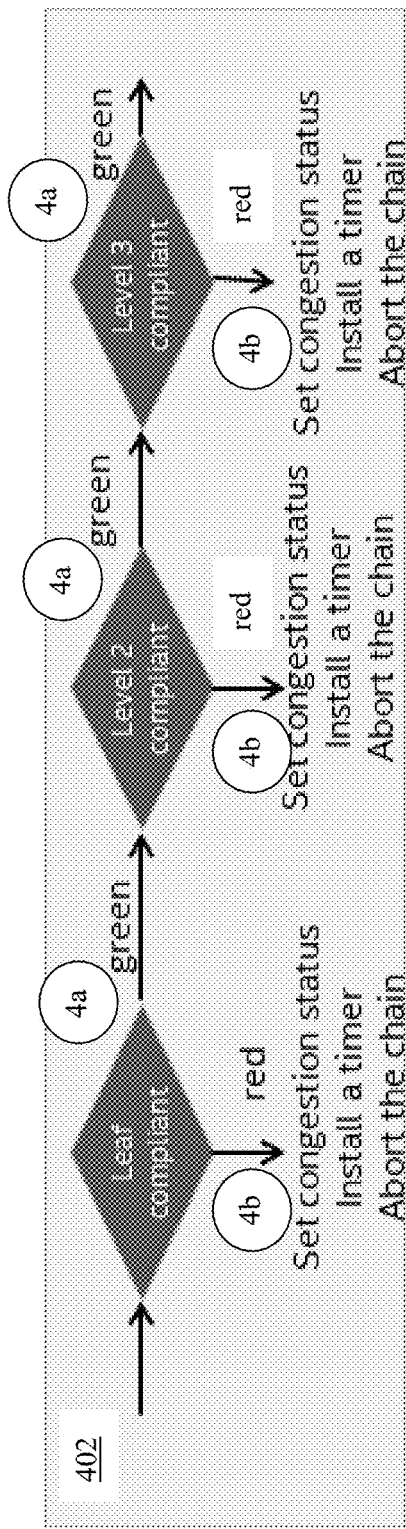
FIG. 4 illustrate aspects of a multi-stage hierarchical traffic shaper, in accordance with alternate embodiments.

FIG. 4 illustrate aspects of a multi-stage hierarchical traffic shaper, in accordance with alternate embodiments. In embodiments, the earlier described single stage traffic shaper 124 can be extended to a multi-level hierarchical traffic shaper by using a dedicated processor core for running the multi-level hierarchy with read/write access to all the hierarchical object states. The traffic shaping may be achieved by running a policer 202 at each level of the desired hierarchy as a policer chain 402. Each leaf in the hierarchy may be associated with a list of ancestral nodes. For processing flows with hierarchical shaping policies, the policing chain may be run. The processing may continue from leaf to parent to the top most node as long as compliant is determined (4*a*). The chain may abort at the first non-compliance in the chain, and installs appropriate timers (4*b*). When a node encounters a stall in its transmission hierarchy, its identifier may be stored with its immediate parent for appropriate arbitration behaviors. Wake up events may be handled as in the standard hierarchical traffic shapers.

Thus, a traffic shaper with a policer and adaptive timers that may advantageously reduce the overhead of traffic shaping has been described. In summary, the usage of a traffic policer supplemented with adaptive timers may reduce the need for timer based traffic regulation. It may reduce the timer requirement to the extent of non-compliant traffic. The traffic shaper may achieve the traffic shaping with a single stage of arrival traffic management and release the traffic without the need for independent enqueue and dequeue management. The traffic shaper may further reduce the timer requirement to durations of no packet arrivals and may be bounded by the amount of buffering supported by a given traffic shaper. The traffic shaper may provide a low overhead fairness across multiple user flows by modulating the outgoing burstiness with incoming traffic arrivals. The traffic shaper may provide an adaptive timer generation that allows for joint latency optimization and complexity reduction of multiple timers. The traffic shaper may be extended to a multi-level traffic shaper. The traffic shaper may be implemented on logical cores with dynamical load balanced cores or statically load balanced cores.

Figure 5:
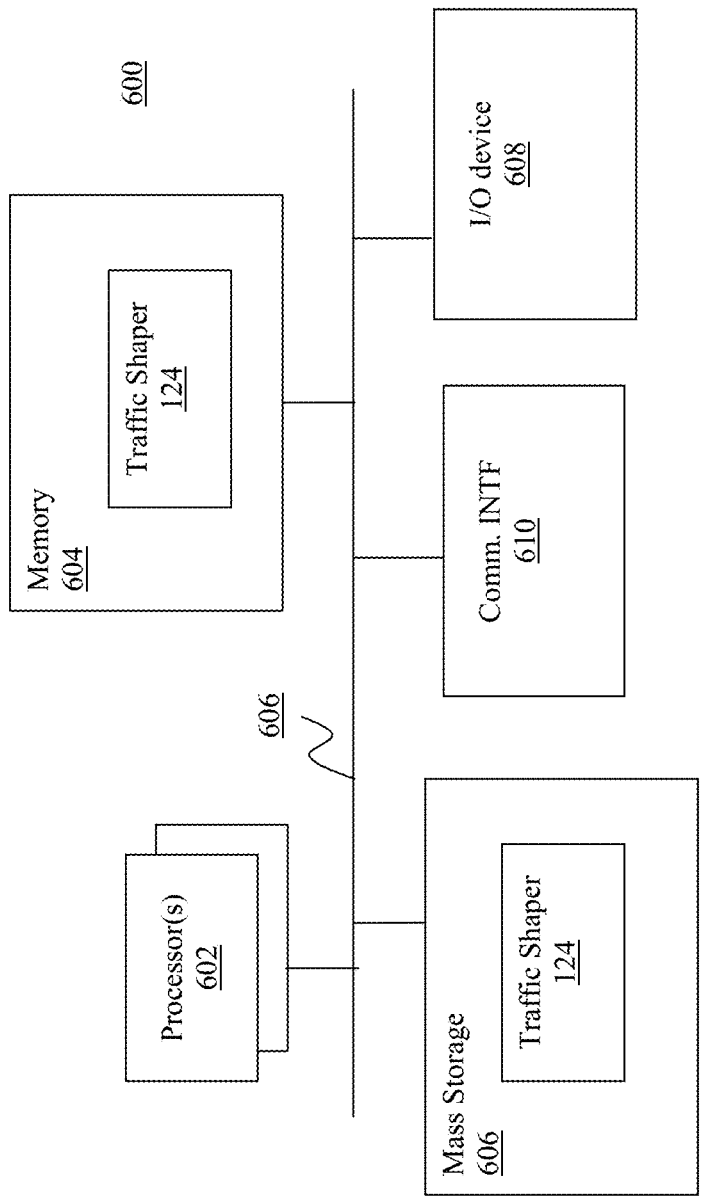
FIG. 5 illustrates a block diagram of example architecture of a computing device suitable for use to practice the present disclosure, in accordance with various embodiments.

Referring now to FIG. 5, wherein a block diagram of example architecture of a computer device suitable for use to practice the present disclosure, in accordance with various embodiments, is illustrated. As shown, computer device 600 may include one or more processors or processor cores 602, and memory 604. In embodiments, multiples processor cores 602 may be disposed on one die. For the purpose of this application, including the claims, the terms "processor" and "processor cores" may be considered synonymous, unless the context clearly requires otherwise. Memory 604 may be any volatile or non-volatile storage. Additionally, computer device 600 may include mass storage 606, which may be any magnetic, optical or solid state storage; communication interfaces 610, such as, Ethernet, WiFi, Bluetooth, 3G/4G and so forth; and I/O device 608 may include cameras, display devices, keyboard, cursor control and so forth. The elements may be coupled to each other via system bus 606, which may represent one or more buses. In the case of multiple buses, they may be bridged by one or more bus bridges (not shown).

Each of these elements may perform its conventional functions known in the art. In particular, memory 604 and mass storage 606 may be employed to store a working copy and a persistent copy of traffic shaper 124 implementing the operations described earlier, e.g., but not limited to, and so forth. Traffic shaper 124 may be implemented in assembler instructions supported by processor(s) 602 or high-level languages, such as, for example, C or a scripting language, that can be compiled into such instructions. The programming instructions may be placed into persistent memory 604 in the factory, or in the field, through, for example, a distribution medium (not shown), such as a compact disc (CD), or through communication interface 610 (from a distribution server (not shown)). The number, capability and/or capacity of these elements 602-610 may vary from embodiments to embodiments and/or depending on whether computing device 600 is a client computing device, a server, or a networking device, such as a gateway, a router, or a switch. The constitutions of these elements 602-610 are otherwise known, and accordingly will not be further described.

Figure 6:
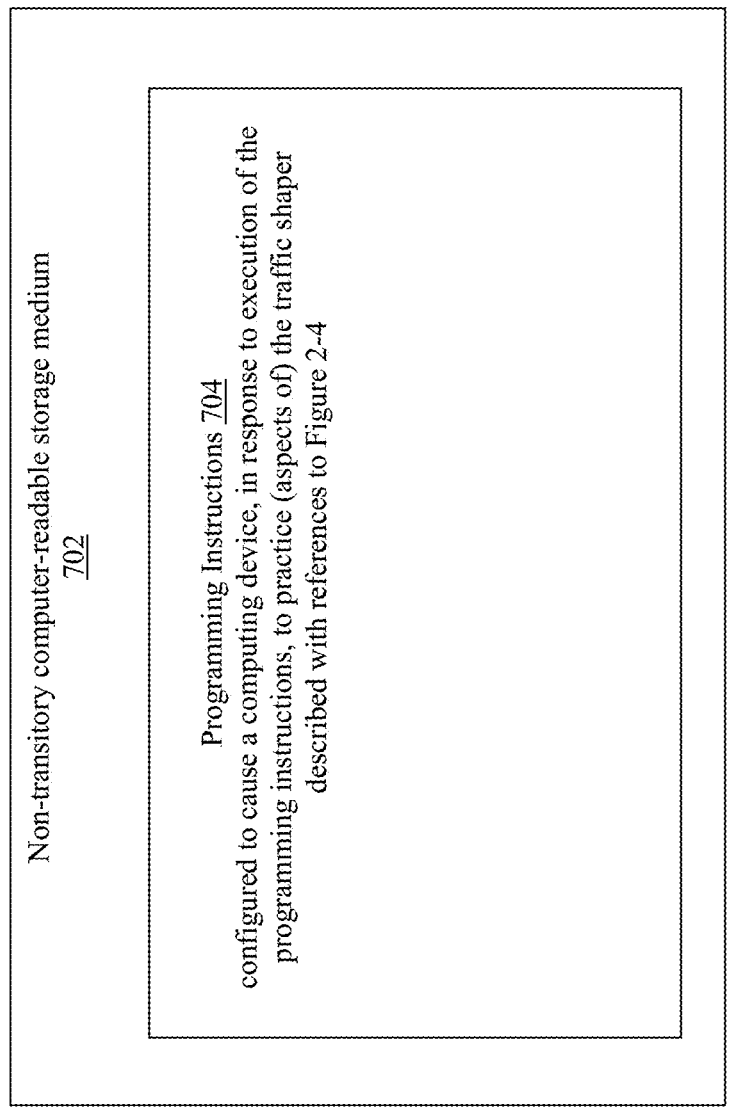
FIG. 6 illustrates an example computer-readable storage medium with instructions configured to enable a computing device to practice aspects of the present disclosure, in accordance with various embodiments.

FIG. 6 illustrates an example non-transitory computer-readable storage medium having instructions configured to practice all or selected ones of the operations associated with traffic shaper 124, and so forth, earlier described, in accordance with various embodiments. As illustrated, non-transitory computer-readable storage medium 702 may include a number of programming instructions 704. Programming instructions 704 may be configured to enable a device, e.g., computer device 100 or 600, in response to execution of the programming instructions, to perform various operations of traffic shaper 124 earlier described. In alternate embodiments, programming instructions 704 may be disposed on multiple non-transitory computer-readable storage media 702 instead. In still other embodiments, programming instructions 704 may be encoded in transitory computer readable media, such as, signals. The programming instruction may also include a piece of software that protects or encrypts the data in the memory, storage, data being processed, and/or in communication channel being exposed to the hackers.

Referring back to FIG. 5, for one embodiment, at least one of processors 602 may be packaged together with a computer-readable storage medium having traffic shaper 124 (in lieu of storing in system memory 604). For one embodiment, at least one of processors 602 may be packaged together with a computer-readable storage medium having traffic shaper 124 to form a System in Package (SiP). For one embodiment, at least one of processors 602 may be integrated on the same die with a computer-readable storage medium having traffic shaper 124. For one embodiment, at least one of processors 602 may be packaged together with a computer-readable storage medium having traffic shaper 124 to form a System on Chip (SoC).

Thus, example embodiments described may include:

Example 1 is an apparatus for computing, comprising: one or more processors; and a traffic shaper operated by at least one of the one or more processors to shape packet traffics of a plurality of regulated traffic generating entities. The traffic shaper may include a policer to process incoming packets of the regulated traffic generating entities and determine whether to forward or temporarily hold the packets, a buffer to store the packets to be temporarily held; and a timer task manager to process timer tasks of the regulated traffic generating entities and determine whether to discard the timer tasks or forward to regulate release of held packets of the regulated traffic generating entities.

Example 2 may be example 1, wherein the policer may determine whether the incoming packets of a regulated traffic generating entity are compliant or non-compliant with a desired packet traffic rate for the regulated traffic generating entities, forward the packets determined to be compliant, and store the packets determined to be non-compliant in the buffer.

Example 3 may be example 2, wherein the policer may first determine an intermediate classification for a packet based at least in part on one or more policies, and downgrade the intermediate classification to non-compliant if the apparatus is congested, or upgrade the intermediate classification to compliant if the apparatus is not congested.

Example 4 may be example 2, wherein to store the packets determined to be non-compliant in the buffer, the policer may enqueue the packets of the regulated traffic generating entity determined to be non-compliant in the buffer.

Example 5 may be example 2, wherein on storage of a packet of the regulated traffic generating entity into the buffer, the policer may further install a timer task for the regulated traffic generating entity, if none exists, and the buffer does not have stored packets of the regulated traffic generating entity prior to storing the packet into the buffer.

Example 6 may be example 5, wherein the policer may install a timer task of the regulated traffic generating entity that is adapted to a moving average packet size of packets of the regulated traffic generating entity that get stored temporarily in the buffer, wherein the policer may continuously calculate the moving average packet size of packets of the regulated traffic generating entity that get stored temporarily in the buffer.

Example 7 may be example 5, wherein the timer task may comprise information on task generation time, expiry time, the moving average packet size, or an amount of credit for releasing stored packets of the regulated traffic generating entity.

Example 8 may be example 5, wherein on installation of a timer task for the regulated traffic generating entity, the policer may store state of the regulated traffic generating entity in a timer granularity specific timer bin.

Example 9 may be example 8, wherein the timer granularity may be based at least on part on the desired packet traffic rate, a moving average size of packets that get buffered, or latency requirements of the regulated traffic generating entity.

Example 10 may be example 1, wherein the timer task manager, on arrival of a timer task of a regulated traffic generating entity, may determine whether the buffer contains stored packets of the regulated traffic generating entity.

Example 11 may be example 10, wherein on determination that the buffer contains stored packets of the regulated traffic generating entity, the timer task manager may further determine whether available credits are sufficient to release one or more held packets of the regulated traffic generating entity.

Example 12 may be example 11, wherein on determination that the available credits are sufficient, the timer task manager may cause one or more held packets of the regulated traffic generating entity to be released.

Example 13 may be example 1, wherein at least one of the one or more processors may comprise a plurality of processor cores, and wherein the timer tasks and packet traffics for a regulated traffic generating entity are load balanced to the same processor core(s) or same virtualized core(s) of the processor cores.

Example 14 may be any one of examples 1-13, wherein the policer may be a first policer, and the apparatus may further comprise at least a second policer; wherein the first and second policers form at least a part of a multi-level hierarchy of policers, with the first and second policers respectively disposed at a first level and a second level immediately below the first level to collaboratively process the incoming packets of the plurality of regulated traffic generating entities and determine whether to forward or temporarily hold the packets.

Example 15 may be example 14, wherein the second policer may forward a packet of a regulated traffic generating entity to the first policer for further processing on determination that the packet is compliant.

Example 16 may be a method for computing, comprising: processing, by a policer of a traffic shaper of a computing device, incoming packets of a plurality of regulated traffic generating entities to determine whether to forward or temporarily hold the packets in a buffer; and processing, by a timer task manager of the traffic shaper, timer tasks of the regulated traffic generating entities to determine whether to discard the timer tasks or forward to regulate release of held packets of the regulated traffic generating entities.

Example 17 may be example 16, wherein determining whether processing of incoming packets may comprise determining whether the incoming packets of a regulated traffic generating entity are compliant or non-compliant with a desired packet traffic rate for the regulated traffic generating entities, forwarding the packets determined to be compliant, and storing the packets determined to be non-compliant in the buffer.

Example 18 may be example 17, wherein processing of incoming packets may comprise first determining an intermediate classification for a packet based at least in part on one or more policies, and downgrading the intermediate classification to non-compliant if the computing device is congested, or upgrading the intermediate classification to compliant if the computing device is not congested.

Example 19 may be example 17, wherein storing the packets determined to be non-compliant in the buffer may comprise enqueuing the packets of the regulated traffic generating entity determined to be non-compliant in the buffer.

Example 20 may be example 17, further comprising on storing a packet of the regulated traffic generating entity into the buffer, installing, by the policer, a timer task for the regulated traffic generating entity, if none exists, and the buffer does not contain stored packets of the regulated traffic generating entity prior to storing the packet into the buffer.

Example 21 may be example 20, wherein installing a timer task for the regulated traffic generating entity may comprise installing a timer task that is adapted to a moving average packet size of packets of the regulated traffic generating entity that get stored temporarily in the buffer, and continuously calculating the moving average packet size of packets of the regulated traffic generating entity that get stored temporarily in the buffer.

Example 22 may be example 20, wherein the timer task may comprise information on task generation time, expiry time, the moving average packet size, or an amount of credit for releasing stored packets for the regulated traffic generating entity.

Example 23 may be example 20, further comprising on installation of a timer task of the regulated traffic generating entity, storing, by the policer, state of the regulated traffic generating entity in a timer granularity specific timer bin.

Example 24 may be example 23, wherein the timer granularity may be based at least on part on the desired packet traffic rate, a moving average size of packets that get buffered, or latency requirements of the regulated traffic generating entity.

Example 25 may be example 16, wherein processing of a timer task of a regulated traffic generating entity may comprise on arrival of a timer of a regulated traffic generating entity, determining whether the buffer contains stored packets of the regulated traffic generating entity.

Example 26 may be example 25, wherein processing of a timer task may further comprise on determination that the buffer does not contain packets of the regulated traffic generating entity, determining whether available credits are sufficient to release one or more held packets of the regulated traffic generating entity.

Example 27 may be example 26, wherein processing of a timer task of the regulated traffic generating entity may further comprise on determination that the available credits are sufficient, causing one or more held packets of the regulated traffic generating entity to be released Example 28 may be example 16, wherein the computing device may comprise at least one processor having a plurality of processor cores, and wherein the method may further comprise load balancing the timer tasks and packet traffics for a regulated traffic generating entity to the same processor core(s) or same virtualized core(s) of the processor cores.

Example 29 may be any one of examples 16-28, wherein the policer is a first policer, and the computing device may further comprise at least a second policer; wherein the first and second policers form at least a part of a multi-level hierarchy of policers, with the first and second policers respectively disposed at a first level and a second level immediately below the first level; wherein processing the incoming packets of a plurality of regulated traffic generating entities may comprise collaboratively processing, by the first and second policers, the incoming packets of the plurality of regulated traffic generating entities to determine whether to forward or temporarily hold the packets.

Example 30 may be example 29, wherein processing a packet of a regulated traffic generating entity may comprise forwarding, by the second policer, the packet to the first policer for further processing on determination that the packet is compliant.

Example 31 may be one or more computer-readable media comprising instructions that cause a computer device, in response to execution of the instructions by one or more processor cores of the computer device, to provide a traffic shaper that may include: a policer to process incoming packets of a plurality of regulated traffic generating entities and determine whether to forward or temporarily hold the packets, a buffer to store the packets to be temporarily held; and a timer task manager to process timer tasks of the plurality of regulated traffic generating entities and determine whether to discard the timer tasks or forward to regulate release of held packets of the plurality of regulated traffic generating entities.

Example 32 may be example 31, wherein the policer may determine whether the incoming packets of a regulated traffic generating entity are compliant or non-compliant with a desired packet traffic rate, forward the packets determined to be compliant, and store the packets determined to be non-compliant in the buffer.

Example 33 may be example 32, wherein the policer may first determine an intermediate classification for a packet based at least in part on one or more policies, and downgrade the intermediate classification to non-compliant if the apparatus is congested, or upgrade the intermediate classification to compliant if the apparatus is not congested.

Example 34 may be example 32, wherein to store the packets determined to be non-compliant in the buffer, the policer may enqueue the packets of the regulated traffic generating entity determined to be non-compliant in the buffer.

Example 35 may be example 32, wherein on storage of a packet of the regulated traffic generating entity into the buffer, the policer may further install a timer task of the regulated traffic generating entity, if none exists, and the buffer does not contain stored packets of the regulated traffic generating entity prior to storing the packet into the buffer.

Example 36 may be example 35, wherein the policer may install a timer task of the regulated traffic generating entity that is adapted to a moving average packet size of packets of the regulated traffic generating entity that get stored temporarily in the buffer, wherein the policer may continuously calculate the moving average packet size of packets of the regulated traffic generating entity that get stored temporarily in the buffer.

Example 37 may be example 35, wherein the timer task may comprise information on task generation time, expiry time, the moving average packet size, or an amount of credit for releasing stored packets of the regulated traffic generating entity.

Example 38 may be example of claim 35, wherein on installation of a timer task of the regulated traffic generating entity, the policer may store state of the regulated traffic generating entity in a timer granularity specific timer bin.

Example 39 may be example 38, wherein the timer granularity may be based at least on part on the desired packet traffic rate, a moving average size of packets that get buffered, or latency requirements of the regulated traffic generating entity.

Example 40 may be example 31, wherein the timer task manager, on arrival of a timer task of a regulated traffic generating entity, may determine whether the buffer contains stored packets of the regulated traffic generating entity.

Example 41 may be example 40, wherein on determination that the buffer does not contain stored packets of the regulated traffic generating entity, the timer task manager may further determine whether available credits are sufficient to release one or more held packets of the regulated traffic generating entity.

Example 42 may be example 41, wherein on determination that the available credits are sufficient, the timer task manager may cause one or more held packets of the regulated traffic generating entity to be released Example 43 may be example 31, wherein at least one of the one or more processors may comprise a plurality of processor cores, and wherein the timer tasks and packet traffics for a regulated traffic generating entity are load balanced to the same processor core(s) or same virtualized core(s) of the processor cores.

Example 44 may be example 31-43, wherein the policer is a first policer, and the apparatus may further comprise at least a second policer; wherein the first and second policers form at least a part of a multi-level hierarchy of policers, with the first and second policers respectively disposed at a first level and a second level immediately below the first level to collaboratively process the incoming packets of the plurality of regulated traffic generating entities and determine whether to forward or temporarily hold the packets.

Example 45 may be example 44, wherein the second policer may forward a packet of a regulated traffic generating entity to the first policer for further processing on determination that the packet is compliant.

Example 46 may be an apparatus for computing, comprising: packet processing means for processing incoming packets of a plurality of regulated traffic generating entities and determining whether to forward or temporarily hold the packets, buffering means for storing the packets to be temporarily held; and timer task processing means for processing timer tasks of the plurality of regulated traffic generating entities and determining whether to discard the timer tasks or forward to regulate release of held packets of the plurality of regulated traffic generating entities.

Example 47 may be example 46, wherein packet processing means may comprise means for determining whether the incoming packets of a regulated traffic generating entity are compliant or non-compliant with a desired packet traffic rate, means for forwarding the packets determined to be compliant, and means for storing the packets determined to be non-compliant in the buffering means.

Example 48 may be example 47, wherein packet processing means may comprise means for first determining an intermediate classification for a packet based at least in part on one or more policies, and means for downgrading the intermediate classification to non-compliant if the apparatus is congested, or upgrading the intermediate classification to compliant if the apparatus is not congested.

Example 49 may be example 47, wherein means for storing the packets determined to be non-compliant in the buffering means may comprise means for enqueuing the packets of the regulated traffic generating entity determined to be non-compliant in the buffering means.

Example 50 may be example 47, wherein packet processing means may comprise means for, on storage of a packet of the regulated traffic generating entity into the buffering means, means for installing a timer task of the regulated traffic generating entity, if none exists, and the buffering means does not contain stored packets of the regulated traffic generating entity prior to storing the packet into the buffering means.

Example 51 may be example 50, wherein means for installing a timer task may comprise means for installing a timer task of the regulated traffic generating entity that is adapted to a moving average packet size of packets of the regulated traffic generating entity that get stored temporarily in the buffer, wherein packet processing means may comprise means for continuously calculating the moving average packet size of packets of the regulated traffic generating entity that get stored temporarily in the buffer.

Example 52 may be example 50, wherein the timer task may comprise information on task generation time, expiry time, the moving average packet size, or an amount of credit for releasing stored packets of the regulated traffic generating entity.

Example 53 may be example 50, wherein packet processing means may comprise means for, on installation of a timer task of a regulated traffic generating entity, storing state of the regulated traffic generating entity in a timer granularity specific timer bin.

Example 54 may be example 53, wherein the timer granularity is based at least on part on the desired packet traffic rate, a moving average size of packets that get buffered, or latency requirements of the regulated traffic generating entity.

Example 55 may be example 46, wherein timer task processing means may comprise means for, on arrival of a timer task of a regulated traffic generating entity, determining whether the buffering means contains stored packet of the regulated traffic generating entity.

Example 56 may be example 55, wherein timer task processing means may further comprise means for, on determination that the buffer does not contain stored packets of a regulated traffic generating entity, determining whether available credits are sufficient to release one or more held packets of the regulated traffic generating entity.

Example 57 may be example 56, wherein timer task processing means may further comprise means for, on determination that the available credits are sufficient, causing one or more held packets of the regulated traffic generating entity to be released Example 58 may be example 46, wherein the apparatus may comprise at least one processor having a plurality of processor cores, and wherein the apparatus may further comprise means for load balancing the timer tasks and packet traffics for a regulated traffic generating entity to the same processor core(s) or same virtualized core(s) of the processor cores.

Example 59 may be any one of examples 46-58, wherein the packet processing means comprise a first policer and a second policer; wherein the first and second policers form at least a part of a multi-level hierarchy of policers, with the first and second policers respectively disposed at a first level and a second level immediately below the first level to collaboratively process the incoming packets of the plurality of regulated traffic generating entities and determine whether to forward or temporarily hold the packets of the regulated traffic generating entity.

Example 60 may be example 59, wherein the second policer may forward a packet of a regulated traffic generating entity to the first policer for further processing on determination that the packet is compliant.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, comprising:
   one or more processors; and
   a traffic shaper operated by at least one of the one or more processors to shape packet traffics of a plurality of regulated traffic generating entities;
   wherein the traffic shaper includes
      a policer to process incoming packets of the regulated traffic generating entities and determine whether to forward or temporarily hold the packets,
      a buffer to store the packets to be temporarily held; and
      a timer task manager to process timer tasks of the regulated traffic generating entities and determine whether to discard the timer tasks or forward to regulate release of held packets of the regulated traffic generating entities;
   wherein the timer tasks of the regulated traffic generating entities are of different timer granularities, and are stored in respective timer bins of corresponding timer granularities;
   wherein the timer task manager processes the timer tasks stored within each timer bin of a particular timer granularity in accordance with their order of storage into the timer bin.

2. The apparatus of claim 1, wherein the policer is to determine whether the incoming packets of a regulated traffic generating entity are compliant or non-compliant with a desired packet traffic rate for the regulated traffic generating entities, forward the packets determined to be compliant, and store the packets determined to be non-compliant in the buffer.

3. The apparatus of claim 1, wherein the timer task manager, on arrival of a timer task of a regulated traffic generating entity, is to determine whether the buffer contains stored packets of the regulated traffic generating entity.

4. The apparatus of claim 1, wherein at least one of the one or more processors comprises a plurality of processor cores, and wherein the timer tasks and packet traffics for a regulated traffic generating entity are load balanced to the same processor core(s) or same virtualized core(s) of the processor cores.

5. The apparatus of claim 1, wherein the policer is a first policer, and the apparatus further comprises at least a second policer; wherein the first and second policers form at least a part of a multi-level hierarchy of policers, with the first and second policers respectively disposed at a first level and a second level immediately below the first level to collaboratively process the incoming packets of the plurality of regulated traffic generating entities and determine whether to forward or temporarily hold the packets.

6. The apparatus of claim 2, wherein the policer is to first determine an intermediate classification for a packet based at least in part on one or more policies, and downgrade the intermediate classification to non-compliant if the apparatus is congested, or upgrade the intermediate classification to compliant if the apparatus is not congested.

7. The apparatus of claim 2, wherein to store the packets determined to be non-compliant in the buffer, the policer is to enqueue the packets of the regulated traffic generating entity determined to be non-compliant in the buffer.

8. The apparatus of claim 2, wherein on storage of a packet of the regulated traffic generating entity into the buffer, the policer is to further install a timer task of a selected timer granularity for the regulated traffic generating entity, if none exists, and the buffer does not have stored packets of the regulated traffic generating entity prior to storing the packet into the buffer.

9. The apparatus of claim 3, wherein on determination that the buffer contains stored packets of the regulated traffic generating entity, the timer task manager is to further determine whether available credits are sufficient to release one or more held packets of the regulated traffic generating entity.

10. The apparatus of claim 5, wherein the second policer is to forward a packet of a regulated traffic generating entity to the first policer for further processing on determination that the packet is compliant.

11. The apparatus of claim 8, wherein the policer is to install the timer task of the selected timer granularity for the regulated traffic generating entity that is adapted to a moving average packet size of packets of the regulated traffic generating entity that get stored temporarily in the buffer, wherein the policer is to continuously calculate the moving average packet size of packets of the regulated traffic generating entity that get stored temporarily in the buffer.

12. The apparatus of claim 8, wherein the timer task of the selected timer granularity comprises information on task generation time, expiry time, the moving average packet size, or an amount of credit for releasing stored packets of the regulated traffic generating entity.

13. The apparatus of claim 8, wherein on installation of the timer task of the selected timer granularity for the regulated traffic generating entity, the policer is to further store a state of the regulated traffic generating entity in the corresponding timer granularity timer bin.

14. The apparatus of claim 9, wherein on determination that the available credits are sufficient, the timer task manager is to cause one or more held packets of the regulated traffic generating entity to be released.

15. The apparatus of claim 13, wherein the timer granularity for the regulated traffic generating entity is selected based at least in part on the desired packet traffic rate, a moving average size of packets that get buffered, or latency requirements of the regulated traffic generating entity.

16. A method for computing, comprising:
processing, by a policer of a traffic shaper of a computing device, incoming packets of a plurality of regulated traffic generating entities to determine whether to forward or temporarily hold the packets in a buffer; and
processing, by a timer task manager of the traffic shaper, timer tasks of the regulated traffic generating entities of various timer granularities stored in respective timer bins of corresponding timer granularity to determine whether to discard the timer tasks or forward to regulate release of held packets of the regulated traffic generating entities, wherein processing comprises processing the timer tasks stored within each timer bin of a particular timer granularity in accordance with their order of storage into the timer bin.

17. The method of claim 16, wherein determining whether processing of incoming packets comprises determining whether the incoming packets of a regulated traffic generating entity are compliant or non-compliant with a desired packet traffic rate for the regulated traffic generating entities, forwarding the packets determined to be compliant, and storing the packets determined to be non-compliant in the buffer.

18. The method of claim 16, wherein processing of a timer task of a regulated traffic generating entity of a particular timer granularity comprises on arrival of a timer of a regulated traffic generating entity of a particular timer granularity, determining whether the buffer contains stored packets of the regulated traffic generating entity.

19. The method of claim 16, wherein the computing device comprises at least one processor having a plurality of processor cores, and wherein the method further comprises load balancing the timer tasks and packet traffics for a regulated traffic generating entity to the same processor core(s) or same virtualized core(s) of the processor cores.

20. The method of claim 16, wherein the policer is a first policer, and the computing device further comprises at least a second policer; wherein the first and second policers form at least a part of a multi-level hierarchy of policers, with the first and second policers respectively disposed at a first level and a second level immediately below the first level; wherein processing the incoming packets of a plurality of regulated traffic generating entities comprises collaboratively processing, by the first and second policers, the incoming packets of the plurality of regulated traffic generating entities to determine whether to forward or temporarily hold the packets; wherein processing a packet of a regulated traffic generating entity comprises forwarding, by the second policer, the packet to the first policer for further processing on determination that the packet is compliant.

21. One or more non-transitory computer-readable media comprising instructions that cause a computer device, in response to execution of the instructions by one or more processor cores of the computer device, to provide a traffic shaper that includes:
- a policer to process incoming packets of a plurality of regulated traffic generating entities and determine whether to forward or temporarily hold the packets,
- a buffer to store the packets to be temporarily held; and
- a timer task manager to process timer tasks of the plurality of regulated traffic generating entities and determine whether to discard the timer tasks or forward to regulate release of held packets of the plurality of regulated traffic generating entities;
- wherein the timer tasks of the regulated traffic generating entities are of different timer granularities, and are stored in respective timer bins of corresponding timer granularities;
- wherein the timer task manager processes the timer tasks stored within each timer bin of a particular timer granularity in accordance with their order of storage into the timer bin.

22. The one or more non-transitory computer-readable media of claim 21, wherein the policer is to determine whether the incoming packets of a regulated traffic generating entity are compliant or non-compliant with a desired packet traffic rate, forward the packets determined to be compliant, and store the packets determined to be non-compliant in the buffer.

23. The one or more non-transitory computer-readable media of claim 21, wherein the timer task manager, on arrival of a timer task of a regulated traffic generating entity of a particular timer granularity, is to determine whether the buffer contains stored packets of the regulated traffic generating entity.

24. The one or more non-transitory computer-readable media of claim 21, wherein at least one of the one or more processors comprises a plurality of processor cores, and wherein the timer tasks and packet traffics for a regulated traffic generating entity are load balanced to the same processor core(s) or same virtualized core(s) of the processor cores.

25. The one or more non-transitory computer-readable media of claim 21, wherein the policer is a first policer, and the apparatus further comprises at least a second policer; wherein the first and second policers form at least a part of a multi-level hierarchy of policers, with the first and second policers respectively disposed at a first level and a second level immediately below the first level to collaboratively process the incoming packets of the plurality of regulated traffic generating entities and determine whether to forward or temporarily hold the packets; wherein the second policer is to forward a packet of a regulated traffic generating entity to the first policer for further processing on determination that the packet is compliant.

* * * * *